US011909778B2

(12) United States Patent
Chan et al.

(10) Patent No.: US 11,909,778 B2
(45) Date of Patent: Feb. 20, 2024

(54) CREATING VIDEO CONFERENCE EXPOS

(71) Applicant: Zoom Video Communications, Inc., San Jose, CA (US)

(72) Inventors: Andy Chan, Santa Clara, CA (US); Jeffrey Houng, Redmond, WA (US); Yuk Fai Lam, San Jose, CA (US); Pankaj Prasad, San Francisco, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 2 days.

(21) Appl. No.: 17/582,932

(22) Filed: Jan. 24, 2022

(65) Prior Publication Data

US 2023/0239330 A1 Jul. 27, 2023

(51) Int. Cl.
*H04L 65/403* (2022.01)
*H04L 65/1069* (2022.01)

(52) U.S. Cl.
CPC ........ *H04L 65/1069* (2013.01); *H04L 65/403* (2013.01)

(58) Field of Classification Search
CPC ..... H04L 65/1069; H04L 65/403; H04N 7/15; H04N 7/147
USPC ............................................ 348/14.01–14.16
See application file for complete search history.

(56) References Cited

U.S. PATENT DOCUMENTS

| 9,853,922 B2 | 12/2017 | Brody et al. |
| 10,952,006 B1 | 3/2021 | Krol et al. |
| 2003/0156135 A1* | 8/2003 | Lucarelli ................ G06Q 30/02 715/757 |
| 2010/0077311 A1* | 3/2010 | Santoro ................ G06T 19/003 715/738 |
| 2012/0166969 A1 | 6/2012 | Gillo et al. |

(Continued)

FOREIGN PATENT DOCUMENTS

| JP | 5368547 B2 | 12/2013 |
| WO | 2013003914 A1 | 1/2013 |

OTHER PUBLICATIONS

A Platform System That Provides Cyber Exhibition in the Virtual-Reality Space KR 20230020697 A (Jung Sang Hoon; FD: Aug. 4, 2021); Date Published: Feb. 13, 2023.*

(Continued)

*Primary Examiner* — Melur Ramakrishnaiah
(74) *Attorney, Agent, or Firm* — Kilpatrick Townsend & Stockton LLP

(57) ABSTRACT

One example method includes receiving configuration information for a virtual expo, the configuration information includes information associated with one or more virtual expo booths; generating a virtual expo floor based on the one or more virtual expo booths; establishing a virtual meeting comprising the virtual expo; receiving requests to join the virtual expo from a plurality of client devices; joining each client device of the plurality of client devices to the virtual meeting; providing, to each joined client device, information describing the virtual expo floor and locations of each of the one or more virtual expo booths; providing a location of a respective participant avatar on the virtual expo floor; receiving, from a first client devices, a selection of a first virtual expo booth; and join the first client device to a second virtual meeting associated with the first expo booth.

20 Claims, 8 Drawing Sheets

(56) References Cited

U.S. PATENT DOCUMENTS

2015/0103136 A1* 4/2015 Anderson .............. H04N 7/155
　　　　　　　　　　　　　　　　　　　348/14.09
2022/0345503 A1* 10/2022 Chauhan ............. H04L 65/1076

OTHER PUBLICATIONS

EP International Search Report and Written Opinion for PCT/US2023/011023 dated May 8, 2023.
Anonymous: "Welcome to Cyber Hitec Let's Take the Next Step Into the Future, Together, Virtual Exhibitor Guide", https://www.hftp.org/hitec/north_America/i/downloads/CYH20_Virtual_Exhibitor_Guide.pdf; Oct. 1, 2020; pp. 1-69.

* cited by examiner

CREATING VIDEO CONFERENCE EXPOS

FIELD

The present application generally relates to video conferencing, and more specifically relates to video conference expo booth previews.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
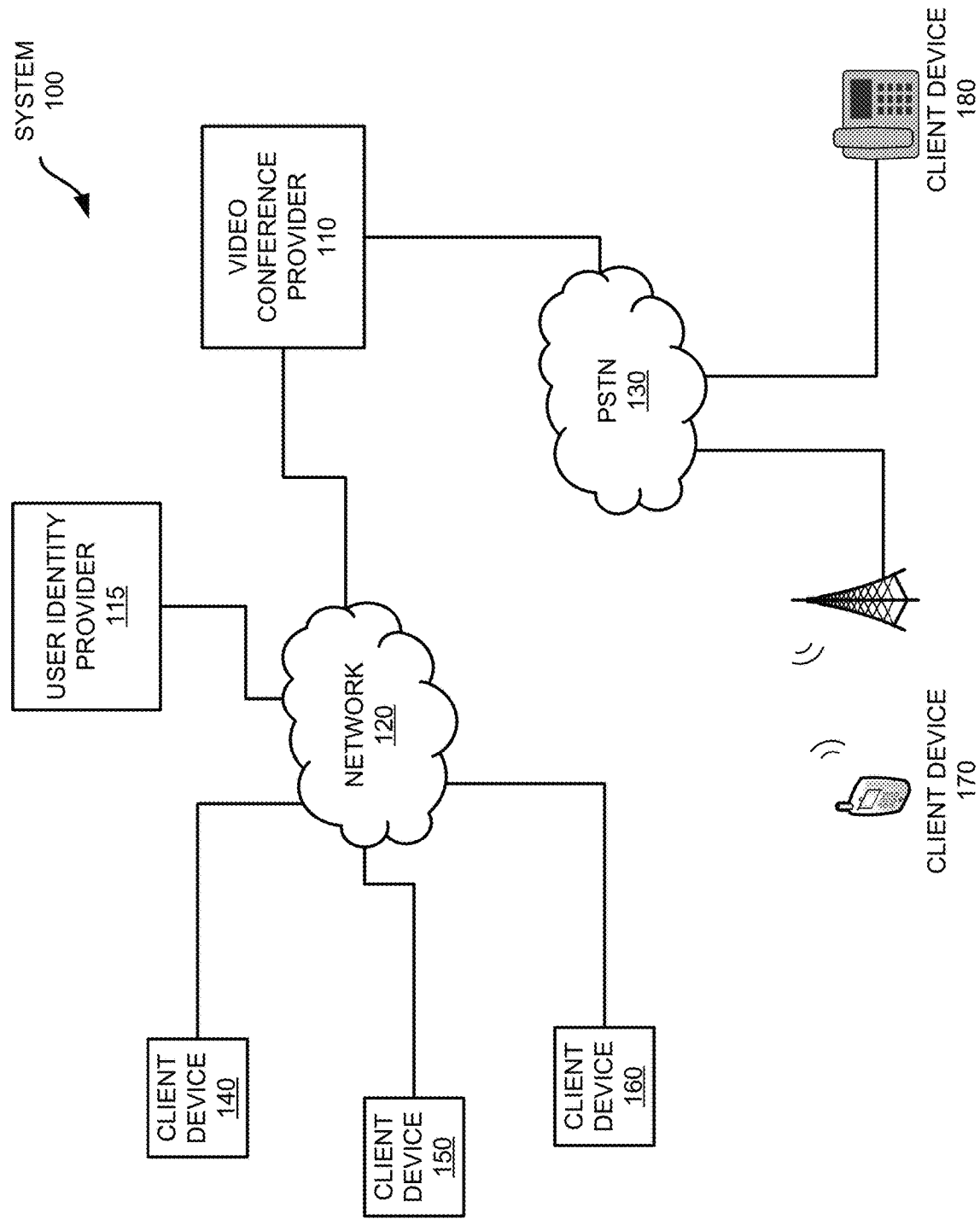
FIGS. 1-3 show example systems for creating video conference expos.

Examples are described herein in the context of creating video conference expos. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable users to host, join, and participate in video conference meetings with one or more other participants. In addition, a video conference provider can provide virtual conference experiences, such as a virtual exposition (or "expo") that provides a virtual expo space in which one or more virtual expo booths may be arrayed. The virtual expo booths may be hosted by sponsors of the virtual expo, by the host of the virtual expo, or by an attendee of the expo. Such virtual expos, or virtual video conference expos, can enable participants to navigate the expo space to visit one or more of the expo booths, view content within the expo booths, or obtain information materials from the expo booths. Further, the expo booths themselves may provide one or more virtual interaction spaces (also referred to as "booth spaces") that participants can select between, as well as virtual "tables" where the participants can access and obtain information materials without entering into a specific booth space. During the expo, participants may join the expo according to their respective level of access, move an avatar within the expo, and interact with expo booths or other participants within the virtual expo.

To establish a virtual expo, a video conference provider obtains sponsorship information from a host of the virtual expo, including sponsoring entities for the expo and various sponsorship levels. In addition, the video conference provider receives information about virtual expo booths (or "expo booths") for the virtual expo, including the sponsors of the expo booths, access level information for the expo booths or content available within the expo booths, scheduling information for the expo booths, such as when each expo booth will be open for access and for which participant or sponsorship access levels, and informational materials that may be available within a particular expo booth.

The video conference provider may then create a virtual expo "floor" within which the various expo booths may be positioned. The positioning may be accomplished manually, such as by the expo host, or the video conference provider assign expo booths to locations based on a template layout, which may specify locations for expo booths of differing sponsorship level or within regions of the virtual expo that are accessible only to participants having sufficient access privileges or that are earmarked for booths having particular types of content.

The video conference provider also receives information about some of the participants that will be permitted to join the virtual expo. For example, participants may register to join the virtual expo by creating a participant profile that may include their name, company, and contact information. In addition, the participant profile may be provided with an access level. Different access levels may be available based on whether participant has purchased a particular level of access or is associated with a sponsor having a particular sponsorship level. Similarly, some participants may only have basic guest access, which may be available for free or for a nominal charge.

Once the virtual expo begins, participants may join the virtual expo by using a video conferencing client application (or "software client") on their client devices. The video conference provider receives the requests from the various participants to join the virtual expo, determines whether they are registered (or otherwise authorized to join), creates a virtual avatar for the participant and associates the user's profile with the avatar. The participant's avatar is then positioned within the virtual expo space and information about the virtual expo is provided to the participant's client software, such as the size and shape of the virtual expo floor, the locations and arrangement of virtual expo booths within the virtual expo floor, and the locations of one or more other participants.

Depending on the participant's access level or the sponsorship level of the participant's employer or organization, the participant's avatar may take on a different appearance or may be able to view more or fewer aspects of the virtual expo. For example, as the participant uses their avatar to navigate the virtual expo, they may be able to access various aspects of the virtual expo according to their access level. In some cases, certain virtual expo booths may have special content available only to participants with specific access levels or may have "early-bird" access to some content before it becomes more generally available. For example, if a company is releasing a new product, they may provide advance access to participants with "Industry Press" access or "Platinum" access, while delaying access to participants with lower tiers of access, such as "Silver" or "General Admission" access.

Thus, the virtual expo sponsor may configure the virtual expo to allow the various sponsors to establish their booths with desired content, to arrange the expo booths within the virtual expo space and regulate access to different parts of the virtual expo to different participants. Thus, unlike a typical conference that might include a linear sequence of scheduled meetings or presentations, a virtual expo provides a non-linear, open-world-style experience in which the participants are able to decide how they would like to interact with the expo, while still regulating the type of access available to the participants as well as limiting the types of expo booths or types or amount of content available to virtual expo sponsors or vendors. Such functionality can provide a virtual expo experience within the context of a virtual meeting that includes multimedia interactions facilitated by the video conferencing capabilities of the video conference provider.

This illustrative example is given to introduce the reader to the general subject matter discussed herein and the disclosure is not limited to this example. The following sections describe various additional non-limiting examples and examples of creating video conference expos.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
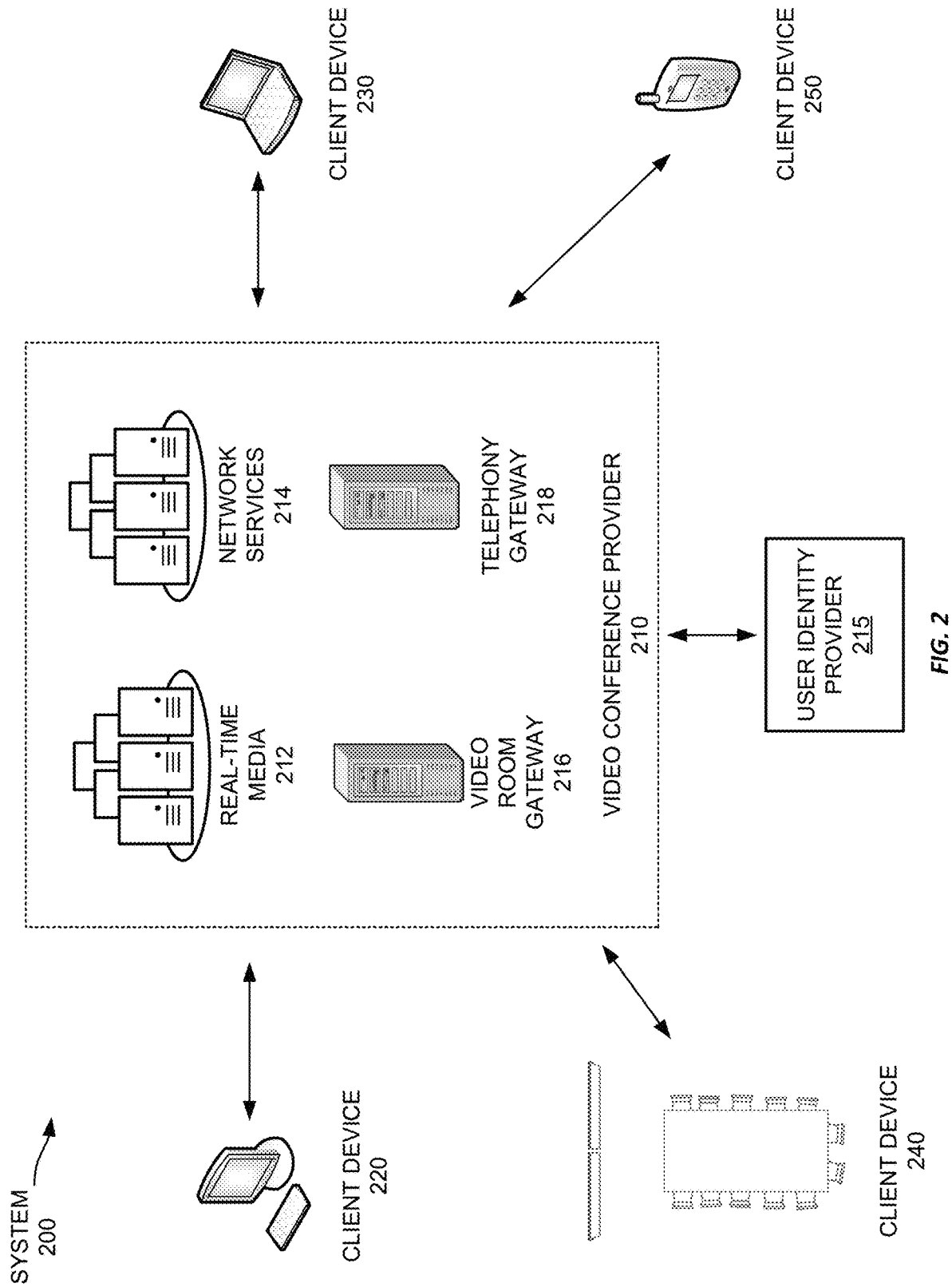

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
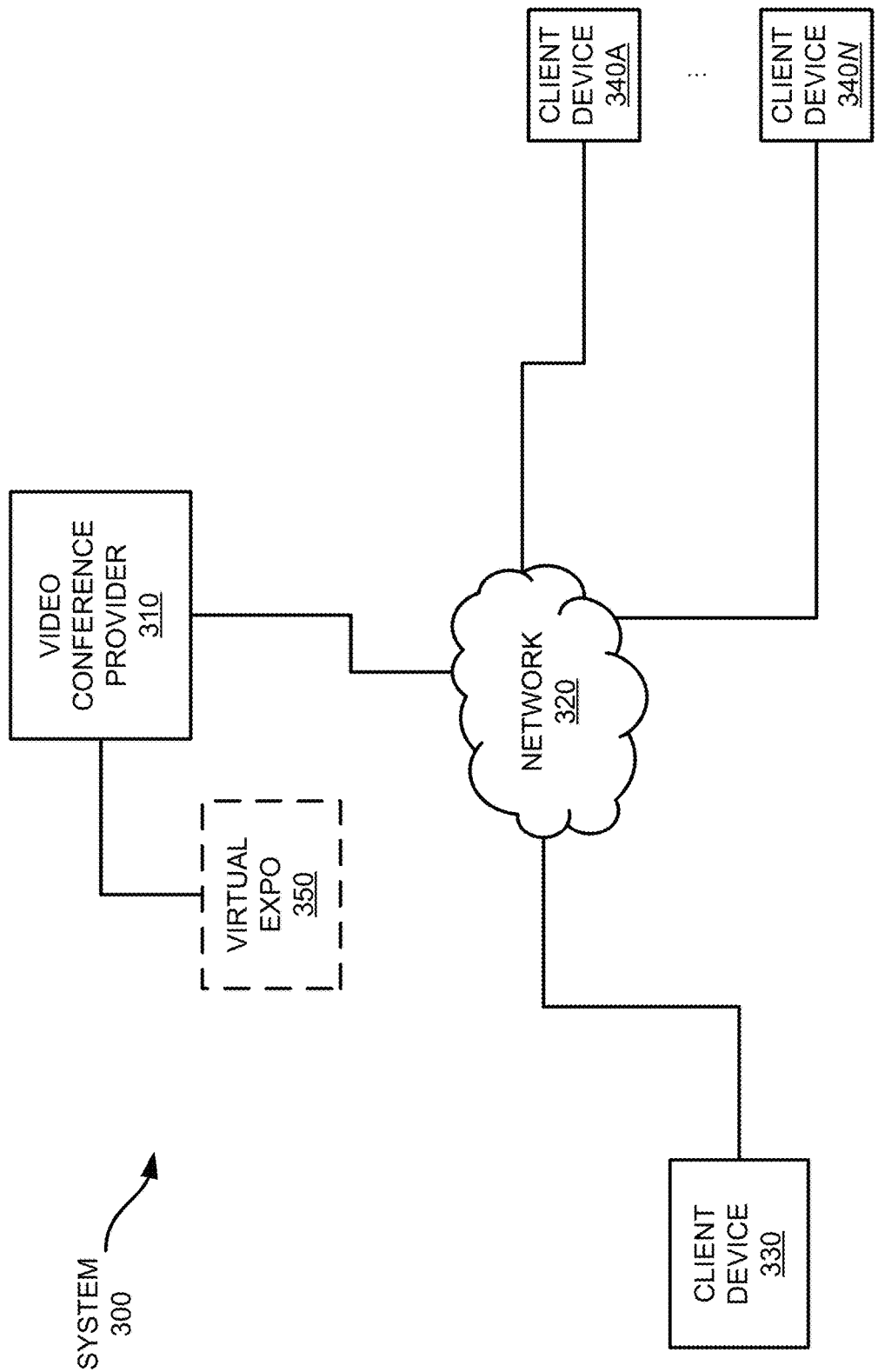

Referring now to FIG. 3, FIG. 3 shows an example system 300 for creating video conference expos. In this example, a video conference provider 310, such as the video conference provider 110, 210 in FIG. 1 or 2, is connected to a communications network 320, such as the internet. An expo host client device 330 and a number of participant client devices 340a-n (n representing any number of participant client devices in this example) are also connected to the network 320.

The user of the expo host client device 330, or the "expo host," connects to the video conference provider 310 to create a new virtual expo. While a single expo host is discussed with respect to this example, any number of users may be expo co-hosts for a virtual expo. The expo host selects an option to create a new virtual expo. After opting to create a new virtual expo, the expo host may then establish initial information about the virtual expo, such as identifying one or more sponsors of the virtual expo, sponsorship levels, a name of the virtual expo, the dates and times during which the virtual expo will be available, various participant access levels for the virtual expo, as well as settings regarding whether the virtual expo will be open or invitation-only.

After making these initial selections, the expo host may identify one or more sponsors that will provide booths within the expo. As discussed above, the virtual expo provides a virtual space within which expo participants may move and interact with other expo participants or with expo booths or other content via different video conferences established and maintained during the course of the virtual expo. As will be illustrated in more detail with respect to FIG. 4, the virtual expo provides a video conference experience whereby participants may be presented with a view of the virtual expo floor (which provides a graphical representation of the virtual expo), a view of their own location on the virtual expo floor (such as by an avatar), avatars of other participants on the virtual expo floor, and various expo booths that may be available for access.

To establish the virtual expo floor, the expo host selects a configuration for the virtual expo floor, which may include establishing a layout for the expo floor, including locations for individual expo booths, establishing regions with restricted access for participants, establishing regions available for expo booths associated with particular tiers of sponsors, and locations that may only be available to the expo host, such as to meet and coordinate aspects of the virtual expo while it is in session. The layout may be selected from a template or may be arranged manually by the expo host, such as by establishing booth locations and regions as discussed above.

In addition to providing a layout for the virtual expo floor, the expo host can establish various access levels, such as sponsorship tiers and participant access levels. Sponsorship tiers may be created and made available to potential exhibitors or presenters for the virtual expo. For example, a virtual expo may be used to provide a virtual industry conference. Sponsorship tiers, such as platinum, gold, silver, and bronze, may be established and available to potential industry sponsors for a corresponding fee. Different sponsorship tiers may enable the corresponding sponsor to establish one or more virtual expo booths within the virtual expo and may enable them to provide differing types of experiences for expo participants. For example, a platinum sponsor may be provided with the option to select one or more locations for virtual expo booths on the expo floor before any other non-platinum sponsor or expo booth host. They may further be allowed to provide a number of virtual booth spaces within a particular expo booth as well as making corresponding information materials available for download or viewing. The platinum sponsorship level may also enable the sponsor to allow any number of participants into a virtual expo booth or virtual at a time, provide extended or early-access hours for participants, and enable the sponsor to obtain information about participants from the virtual expo, such as profile information entered by the participants that join their virtual expo booths or booth spaces.

Lower-tier sponsorship levels may provide fewer of such privileges, such as by limiting the number of virtual expo booths, virtual booth spaces, numbers of participants per expo booth or booth space, or access to information about the participants. Thus, as the expo host contacts sponsors and obtains sponsorship purchases, they may create corresponding sponsor entities within the virtual expo and assign a corresponding sponsorship level to each sponsor entity. A single sponsor entity may be created for each sponsor and may be populated with information about the sponsor, logos or slogans for the sponsor, and a corresponding sponsorship level. Virtual expo booths may then be associated with the various sponsors, whether assigned by the expo host or selected by the individual sponsors, e.g., based on their respective sponsorship tier.

In addition to establishing sponsors and sponsorship tiers, the expo host may establish participant access levels. Access levels may enable participants to engage with the virtual expo to a greater or lesser extent. The expo host may have "host" level access, which may provide essentially unfettered access to interact with the virtual expo, including access to individual virtual expo booths or booth space, and access to expo participants or sponsors. Lower-level access levels may be assigned to participants, such as based on their association with an expo sponsor, e.g., platinum, gold, etc., or based on purchasing tickets to the expo at different levels. For example, the expo host may offer ticket packages to expo attendees for varying prices. Top-level access may enable participants to access more of the expo booths, have access to sponsors or other expo participants, early access to the virtual expo or access to exclusive content within the expo, such as sneak peeks of new products. Lower levels of access may provide fewer access privileges, including a base level of access, which may be available to unticketed participants, that only provides access to the virtual expo during limited times, only provides access to virtual expo booths in a general admission or public portion of the virtual expo, and limited (if any) ability to interact with other expo participants or within virtual expo booths or booth spaces.

Once the expo host has created the various sponsorship levels and participant access levels, they may publicize the expo for registration, such as on social media platforms, online advertisements, etc. As the expo host begins receiving reservations from sponsors or participants for the virtual expo, the expo host may establish corresponding sponsor entities or participant entities for each registered sponsor or participant. In addition, the expo host associates an appropriate sponsor level to the sponsor or access level to the participant. This process may continue up until the virtual expo begins or even while the virtual expo is on-going.

As a part of registering, a participant may provide certain information to the video conference provider 310, which may be stored in a profile for the participant. Such information may include the participant's name, contact information, and employer. It may also include information about the participant such as particular topics of interest to the participant, whether the participant is interested in networking with other participants at the virtual expo, and whether the participant would like to be visible to other participants on a graphical representation of the virtual expo. Once a participant has registered for the virtual expo, they may be provided with access information for the virtual expo, such as a link to a video conference for the virtual expo.

All of such expo configuration information is provided to the video conference provider 310 by the host or by the sponsors or participants during the process of creating the virtual expo. Thus, the video conference provider may receive configuration information for the virtual expo over a period of days, weeks, or months prior to the virtual expo beginning.

Once the scheduled time for the virtual expo arrives, the video conference provider 310 begins the virtual expo by creating a meeting, generally as discussed above with respect to FIGS. 1 and 2, to host the virtual expo floor. In addition, it may establish other video conferences corresponding to the configured virtual expo booths and at the scheduled times for the respective expo booths. Unlike in a conventional video conference, however, video conferences corresponding to the virtual expo booths (or virtual booth spaces within the video expo booths) may only be accessible via interactions within the virtual expo floor. Thus, a participant may join other video conferences from the virtual expo floor by navigating near a virtual expo booth or by selecting a virtual expo booth to interact with. However, they may not receive any other information that would enable them to access such video conferences, such as a link to the virtual expo booth.

As participants contact the video conference provider 310 to join the virtual expo 350, it may verify their identities with a user identity provider, e.g., user identity providers 115, 215, determine whether the participant has registered for the virtual expo, and, if so, a corresponding access level for the participant. It may also use participant profile information to determine what information to provide to the participant during the virtual expo. For example, as the participant navigates the virtual expo floor, the video conference provider 310 may provide information about nearby participants on the virtual expo floor, which the participant's client device may display on the graphical representation of the virtual expo floor. However, if one of the nearby participants has elected to remain hidden, the video conference provider may not provide information about the hidden participant to other nearby participants, or it may provide an instruction to not display such participant. However, depending on various participants access levels, such profile information may be overridden. For example, the expo host may be able to see the location of all participants, regardless of their profile settings.

During the virtual expo, the video conference provider 310 provides information about the virtual expo floor to participants who join the virtual expo. This information may be information to allow the participants' client devices to generate and display a graphical representation of the virtual expo or it may be a graphical representation created at the video conference provider 310 and provided in video streams to respective participants. However, because different participants will likely be at different locations within the expo, the video conference provider 310 may need to generate different graphical representations suitable for different participants.

In addition to providing the information about the virtual expo floor, the video conference provider 310 also maintains location information for each participant within the virtual expo floor to enable the participants' client devices to display a representation of the participant, e.g., an avatar, at the corresponding location on the graphical representation of the virtual expo floor.

Figure 4:
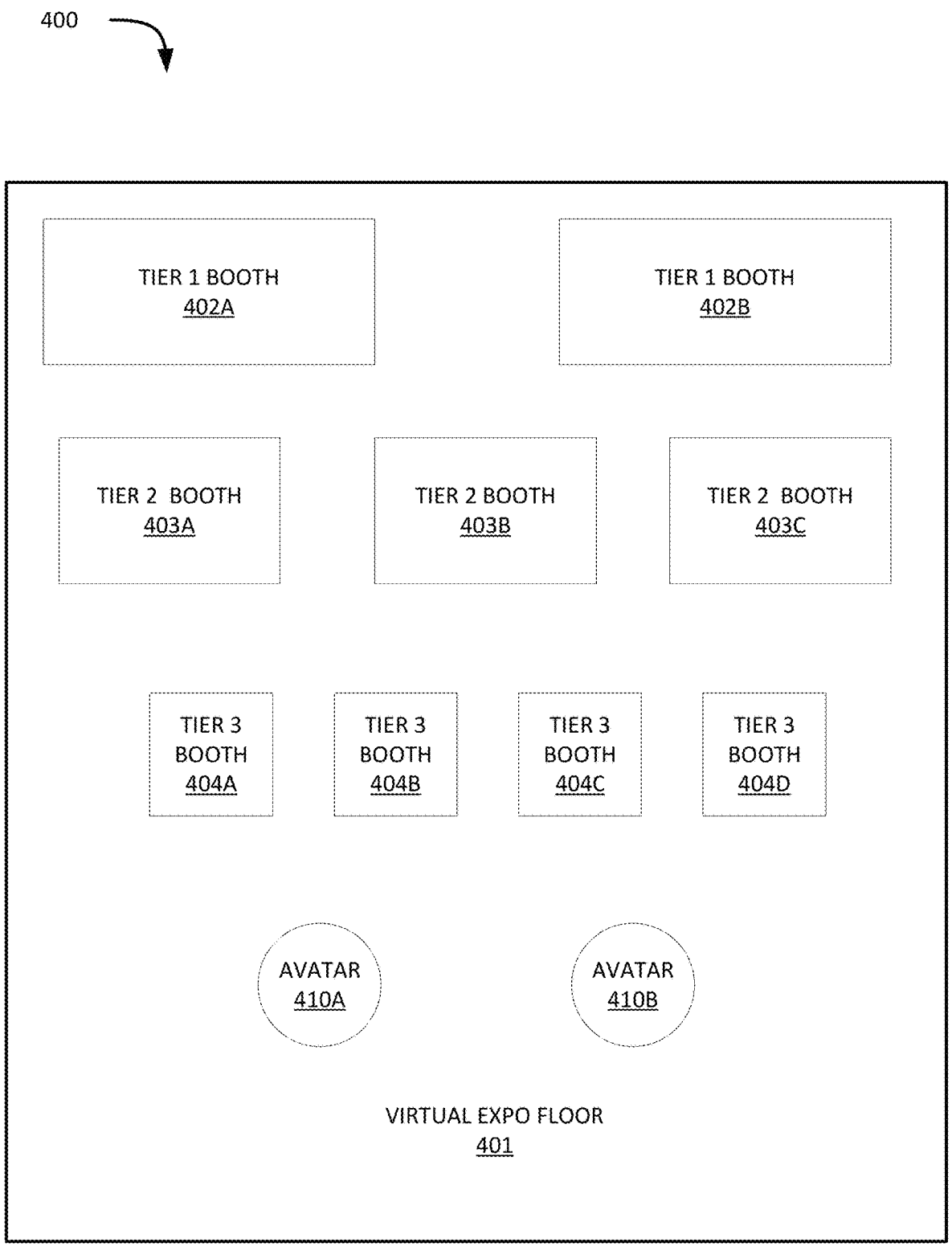
FIG. 4 shows an example layout for a virtual expo floor.

Referring now to FIG. 4, FIG. 4 illustrates a graphical representation of a virtual expo 400. The virtual exposition 400 is described with relation to the systems described in FIG. 3. The virtual exposition 400 may include an exposition floor 401, one or more tier 1 booth 402a-b, one or more tier 2 booths 403a-c, and one or more tier 3 booths 404a-d (the one or more tiers of booths may be referred to collectively as "booths"). Still further tiers may be used according to different examples. During the virtual expo, one or more avatars 410a-b may also be present.

As discussed above, the virtual expo 400 is a videoconference, hosted by an exposition host via a video conference provider 310. Each booth may in turn be a videoconference within the virtual expo 400, hosted by the respective sponsors. During the virtual expo 400, the booths may be available for participants to join at their election, though sponsors may restrict access to the booth or to content within the booth based of different participant access levels or other parameters such as a number of participants already in the booth. And while this example shows a particular arrangement for the booths within the virtual expo floor 401, any suitable arrangement may be employed.

In addition to providing expo booths, the expo floor 401 may also include one or more backgrounds. For example, the expo floor 401 may include a background that represents a physical convention center floor. The expo floor 401 may include different backgrounds in different regions of the expo floor 401. In some embodiments, the backgrounds in different regions of the expo floor 401 may be associated with a subject matter. The booths may then be arranged into the regions by their respective subject matters, correlating to the associated subject matter of each region. In some embodiments, the subject matter of each booth may be entered into a database of other data structure by the expo host. In other embodiments, the subject matter of each booth may be entered in the database or other structure by the sponsor of that booth.

Each booth may be represented by an image or logo. The image or logo, and/or the complexity thereof, may be determined by the tier of the respective booth. Such a representation may be selected by the respective sponsor, if their sponsorship level provides such an option. For example, a tier 3 booths 402a-d may be represented by text against a white background with the name of the sponsor. The tier 2 booths 403a-c may be represented by an image file selected by the sponsor in a format such as a Joint Photographic Experts Group (JPEG), Portable Networks Graphic (PNG), Tagged Image File Format (TIFF), or other such image file format. The Tier 1 booth 402a-b may be represented by a dynamic image, such as video file format such as the Graphics Interchange Format (GIF), the Moving Picture Experts Group (MPEG) format, or by cycling through different static images. Other representations would be readily apparent to one of ordinary skill in the art.

Each participant of the virtual expo 400 may be represented by an avatar such as the avatars 410a-b, which may be selectable according to the participant's access level. The avatars 400a-b may be customizable by their respective participant. The avatars 410a-b may be represented by an image file in a format such a JPEG, PNG, TIFF, or other such image file. The avatars 410a-b may also be represented by video files in a format such as a GIF, MPEG, or other video file. These different options may be available only to certain participant access levels, depending on the virtual expo's configuration.

Figure 5:
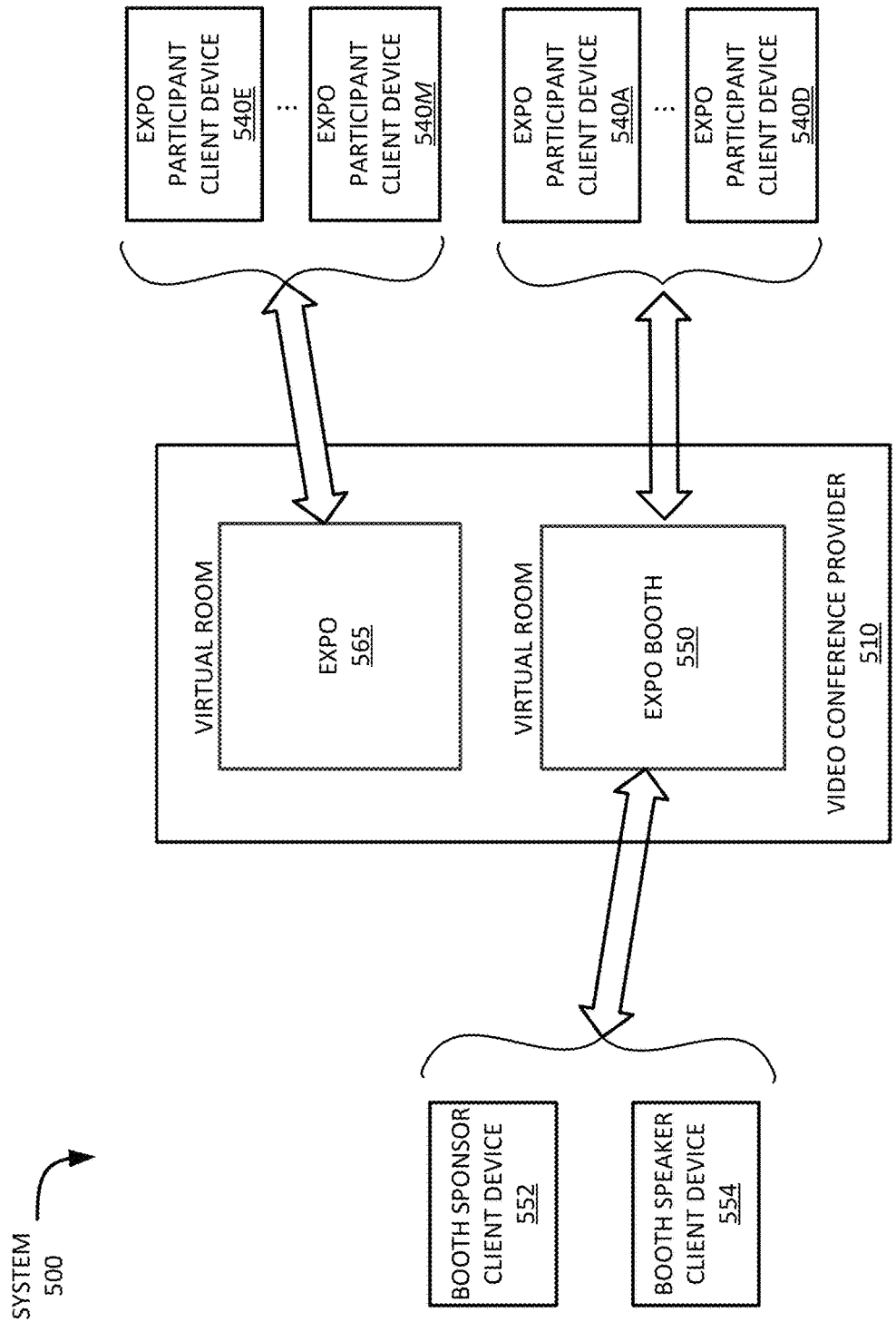
FIG. 5 shows an example system for creating video conference expos.

Referring now to FIG. 5, FIG. 5 illustrates an example system 500 for creating video conference expos. As discussed above, a virtual expo may include a first video conference, such as a virtual expo floor 565. Video conference provider 510 may also establish the booth 550, in which a participant can experience the second video conference with one or more other participants.

The expo 565 and the booth 550 may be considered virtual "rooms" in which participants of the expo can interact. Expo 565 is a virtual "room" in which the participants of the expo can interact with each other or with objects within the virtual expo floor, such as virtual expo booths. The booth 550 may be a virtual "room" in which participants of the expo can enter to virtually interact during the expo 565. As described above, the expo 565 may include more than one booth 550, and the booth 550 may include a booth space, another virtual room, within the booth 550 itself from which still additional video conferences may be available with various content or participant interactions. A "booth space" provides a further separate virtual meeting within an expo booth within which participants may interact or may avail themselves of other content within the booth space, such as interact with booth sponsors or other booth personnel, one or more available presentations or downloadable documents, such as product brochures, etc. Further, different types of interactions may be available depending on the participant's access level. For example, participants with higher access levels may be able to directly interact with booth participants within the expo booth or booth space and with booth personnel, while participants with lower access levels may only be able to interact with booth personnel, but not with other participants.

There may be different types of booths 550. For example, and as discussed above, booths may be assigned a tier, such as based on sponsorship level. The types of booths may vary by degree of visibility and accessibility by participants. The booths may also vary by type of content available to participants. For example, a first booth of one tier may be represented by an image, while a second booth of a second tier may be represented by a video. The different types of booths and the tier levels are described in greater detail with respect to FIG. 5.

During an expo, exchange of the audio and video streams to and from a user's client device may depend on the virtual room that the user is in. For example, as illustrated by FIG. 5, when participants E-M, corresponding to client devices 540e-m, are in the expo 565, they may be able to interact with other participants by exchanging audio and video streams with other participants in the expo 565, such as by requesting a conversation with another participant. When an expo participant enters the expo booth 550, the expo participant may no longer receive audio and video streams exchanged by participants on the expo 565. In other words, the video conference provider 510 may continue to receive the multimedia streams from the expo participant client devices 540e-m but may not transmit the audio and video streams to the expo client devices 540a-d because participants A-D are in the booth 550.

While in the expo booth 550, the participants A-D may exchange audio and video streams with the booth sponsor, booth speaker, or other participants in the expo booth 550. For example, the audio and video streams from the expo participant client devices 540a-d may be received by the video conference provider 510 and transmitted to the booth sponsor client devices 552 and the booth speaker client device 554, and vice versa. As noted above, in embodiments where the booth 550 includes a booth space, the participants A-D's ability to exchange audio and video streams with the speaker in the booth space may be limited. For example, depending on the type of content, participant access level, etc., the video conference provider 510 may receive audio and video streams from the booth speaker client device 554, and those audio and video streams are transmitted to the expo participant client devices 540a-d, the audio and video streams from the expo participant client devices 540a-d may not be transmitted by the video conference provider 550 to the booth speaker client device 554, unless permission is granted to do so. In this manner, a booth space may provide for a one-way communication meeting, allowing for presentations to an audience within the booth, or it may enable two-way communication between some or all of the participants within the expo booth or booth space.

As noted above, the virtual expo may include more than one booth 550, and the booth 550 in turn may include one or more booth spaces. Thus, during the virtual expo, a participant may navigate between different video conferences, beginning with the virtual expo floor before proceeding into an expo booth and potentially further into a booth space within an expo booth.

Figure 6:
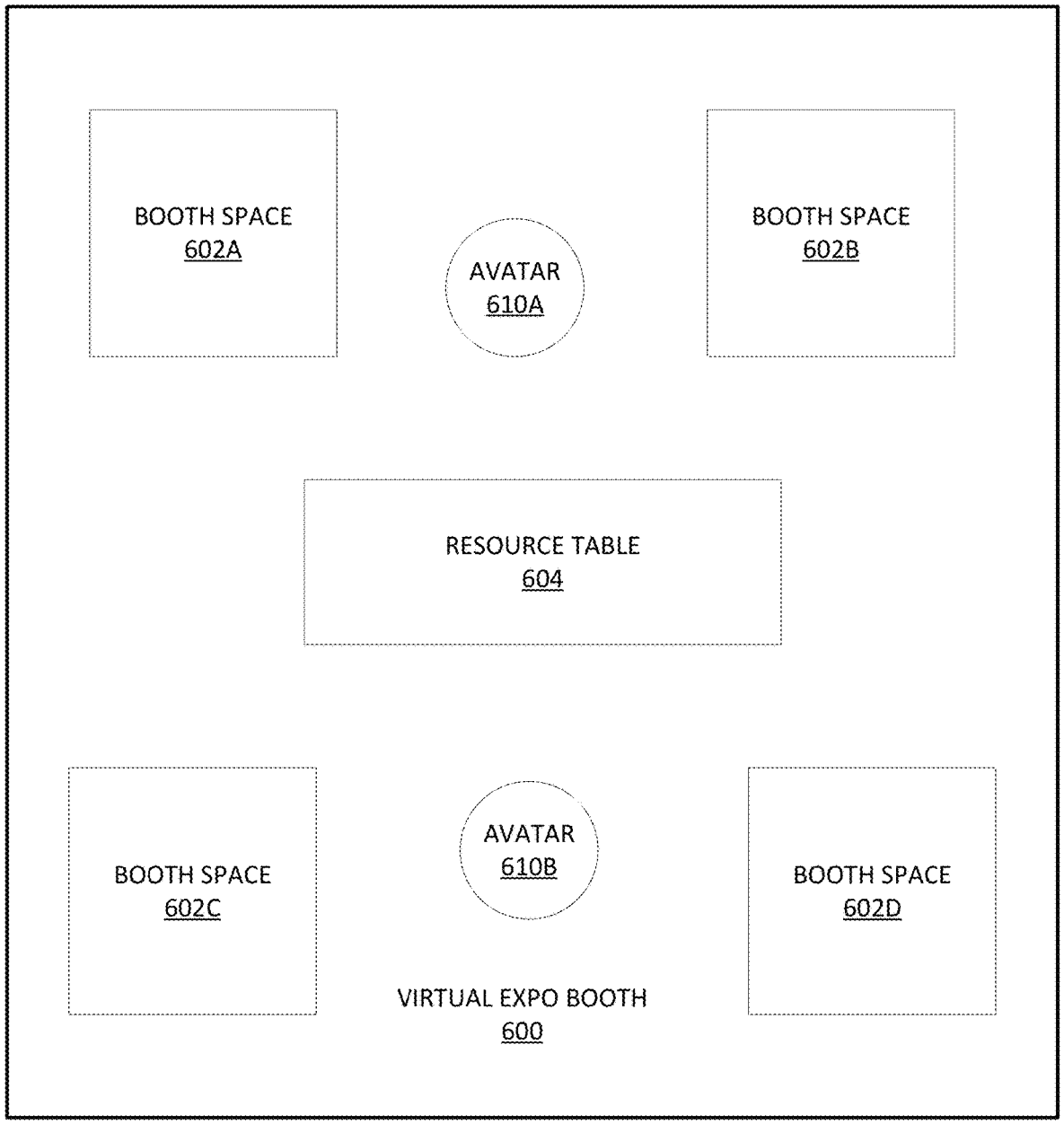
FIG. 6 shows an example layout for a virtual expo booth.

Referring now to FIG. 6, FIG. 6 is an illustration of a graphical representation of an example virtual expo booth. The booth 600 may be similar to any of the booths shown in FIG. 5, and therefore be a graphical representation of a videoconference within a virtual expo. For example, the booth 600 may be the tier 1 booth 502a, and have an associated permission level that permits the booth 600 to include one or more booth spaces 602a-d and a resource table 604. During the virtual expo, the booth 600 may host one or more participants that have elected to join the booth 600, who are represented by the avatars 610a-b. The avatars 610a-b may represent the same participants as the avatars 510a-b, where the participants have joined the booth 502a.

The booth spaces 602a-d may be graphical representations of videoconferences within the booth 600. In other words, the booth spaces 602a-d may be yet another nested videoconference within a virtual expo. The booth spaces 602a-d may be graphically represented by an image file in a format such as a JPEG, PNG, TIFF, or other image file. The booth spaces 602a-d may be represented by video files in a format such as a GIF, a MPEG, or other video file. The graphical representation may include sound files. The graphical representation of each booth space 602a-d may be determined by the sponsor of the booth.

The graphical representation of each of the booth spaces 602a-d may include information including a subject matter being discussed by a speaker within each of the booth spaces 602a-d. The speaker may be similar to the speaker 407 in FIG. 4. In some embodiments, the sponsor of the booth 600 may set permissions for each of the booth spaces 602a-c. The permissions may include a number or participants allowed in each booth space, whether or not a participant is allowed to join the booth space without an invitation, whether or not the speaker is allowed to invite participants for their associated booth space, and other related permissions.

The resource table 604 may be graphically represented by an image file in a format such as a JPEG, PNG, TIFF, or other image file. The resource table 604 may also be represented by video files in a format such as a GIF, a MPEG, or other video file. In some embodiments, the resource table 604 may include links to one or more files associated with a subject matter being discussed in one or more of the booth spaces 602a-d. The links may cause a file such as a PDF filed to be downloaded from a first computing device to a second computing device. In some embodiments, the second computing device may be associated with a participant of within the booth 600.

As participants attempt join expo booths or booth spaces, the video conference provider 310 accesses the participants' profiles and access levels to determine their respective permissions with the video conferences corresponding to the expo booths or booth spaces. Depending on their access levels, the video conference provider 310 may enable or disable the participants' abilities to provide audio or video streams, engage in text chat discussions, or otherwise interact with the video conference. For example, the lowest level of access may allow a participant to join an expo booth or booth space, but only allow them to receive audio and video streams from the booth sponsor or booth personnel, but not other participants. Higher levels of access may allow the participants to engage with the other participants via audio, video, text chat, or other means. These levels of access are configured by the expo host, the expo booth's sponsor, or based on sponsorship levels or tiers as discussed above during configuration of the virtual expo.

Figure 7:
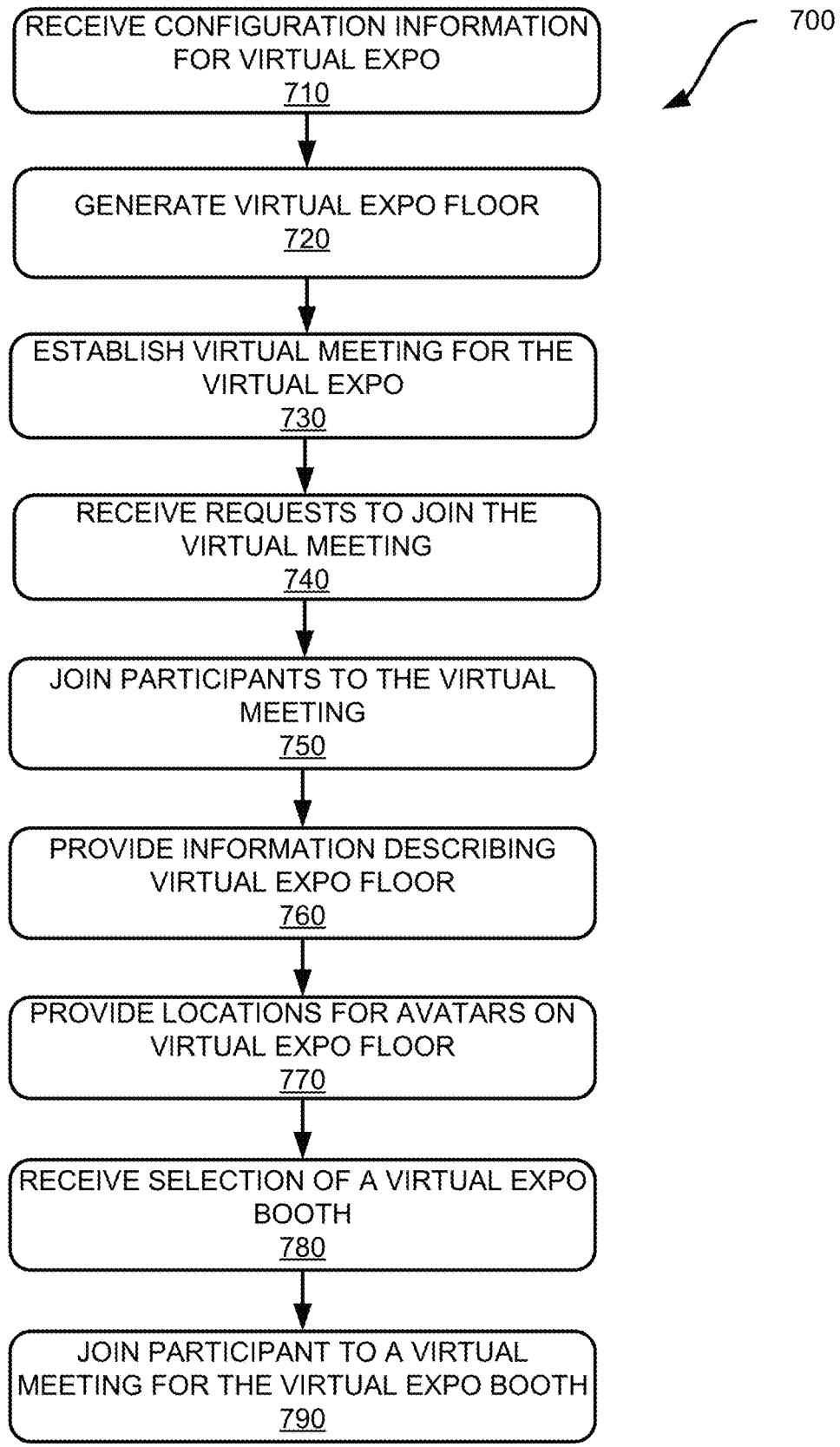
FIG. 7 shows an example method for creating video conference expos.

Referring now to FIG. 7, FIG. 7 shows an example method 700 for creating video conference expos. The method 700 will be described with respect to the example system 300 shown in FIG. 3 and the example virtual expo 400 shown in FIG. 4; however, any suitable system or virtual expo may be employed.

At block 710, the video conference provider 310 receives configuration for a video conference virtual expo, or virtual expo. As discussed above with respect to FIGS. 3-6, an expo host may contact the video conference provider 310 to create and configure a new virtual expo. As a part of creating a virtual expo, the expo host may establish one or more days and times during which the virtual expo will be open to participants. For example, the expo host may establish a virtual expo over a weekend, such as on Friday from 8 am to 6 pm, Saturday from 8 am to 8 pm, and Sunday from 11 am to 4 pm.

In addition to establishing times for the virtual expo, the expo host may establish a number of participants that may join, one or more levels of sponsorship, and one or more access levels for participants in the virtual expo. In this example, the expo host establishes the following sponsorship levels: Presenting, Platinum, Gold, and Silver. The expo host also establishes participant access levels, with four access levels (Presenting, Platinum, Gold, and Silver) corresponding to the sponsorship levels as well as an additional VIP access level, an Industry Press access level, a General Admission access level, and a Public access level. In some examples, however, expo sponsors may create custom sponsorship levels and may select different functionality to incorporate into the sponsorship level.

The expo host also establishes a layout for the virtual expo floor using a template. The layout includes one or more regions within which one or more virtual expo booths are positioned. It may also assign sponsorship levels to regions or to locations for individual expo booths. For example, virtual expo booths located near a location where new participants join the virtual expo may be reserved for a sponsor at the Presenting or Platinum sponsors, while locations farther from the entrance to the virtual expo may be usable by sponsors of any level. For example, the virtual expo floor in FIG. 4 has virtual booth locations assigned to sponsors of different sponsorship tiers.

Further, regions within the expo may be assigned categories or themes, and virtual expo booths may be assigned to regions based on corresponding categories or themes for the expo booths or for sponsors of the expo booths. For example, a virtual industry expo for the gaming industry may assign categories such as adventure, racing, action, military, and role-playing to different regions within the virtual expo floor. Virtual expo booths within those regions may be associated with those categories and more central or prominent locations may be reserved for sponsors of higher sponsorship level. Such techniques may enable participants to more easily identify virtual expo booths of interest to them.

And while the expo host employs a template in this example, they may provide an expo floor layout using other techniques, or a combination of techniques. For example, they expo host may begin with an empty virtual expo floor and then manually add locations for individual virtual expo booths or regions. Similarly, the expo host may add locations for virtual expo booths or regions to a template layout to modify the template. The expo host may also move virtual expo booths or regions, such as by selecting and dragging the booth or region to a new location, or by selecting a region or booth with which to swap locations. Further, in some examples, a virtual expo may be configured to occur simultaneously with a live, in-person expo, which may enable participants to join the live expo without attending in-person. In some cases, the expo host may obtain an expo layout for the live expo, e.g., as a CAD drawing, and import that layout as the layout for the virtual expo.

As discussed above, configuration information is received from the expo host, but may also be received from other entities. For example, when a new sponsor registers for the virtual expo, they may select their sponsorship level according to a fee schedule. They may provide information about the sponsor, such as a name, an industry, relevant keywords or phrases, one or more categories in the virtual expo to associate with the sponsor, and if the sponsor elects to sponsor a virtual expo booth, the number of expo booths to be sponsored. The sponsor may be presented with a view of the virtual expo floor to enable them to select a location for their expo booth(s) or the location may be assigned by the video conference provider 310 or by the expo host.

If a sponsor elects to sponsor a virtual expo booth, they may provide further configuration information for the virtual expo booth, such as days and times when it is available to participants. In addition, depending on a sponsorship level or tier, a virtual expo booth, such as shown in FIG. 6, may be configured to have a number of different booth spaces within the virtual expo booth (which may have a limit based on the sponsorship level of the sponsor), a resource table, and when different booth spaces may be open to participants. The sponsors may provide electronic documents to be available from the resource table or links to such documents. They may also provide branding or graphical features to be applied to the virtual expo booths to identify the expo booth to participants or to provide a more engaging environment. Such branding or graphical features may include static images, video content, or even interactive content, such as questionnaires, quizzes, or games.

Information about individual sponsors may be obtained by the video conference provider 310 from the sponsors themselves or may be received from the expo host. Further, configuration information for virtual expo booths may be received from sponsors or from the expo host.

In addition to registering sponsors, participants may register to attend the virtual expo. Participants may register as employees or as otherwise associated with a sponsor and may receive an access level based on the sponsorship level of the sponsor. Alternatively, participants may register individually and may obtain an access level according to different available prices. As the participants register, they may be asked to provide certain information, such as their name, contact information, employer or organization, interests, keywords or phrases, and whether they are open to networking with others. Such information may be used by the expo host to communicate with the participant or by the video conference provider 310 to mediate the participant's interaction with the virtual expo. For example, a participant who identifies particular interests may be placed into the virtual expo near a region or a virtual expo booth within the virtual expo floor that shares one or more categories or keywords or phrases with the participant's interests. In another example, a participant who indicates that they are open to networking may be able to see the location of other participants within a certain range of them who are also open to networking.

Such configuration information, as well as any other suitable configuration information, may be received by the video conference provider 310 over a period time from when the virtual expo is initially created until the virtual expo begins, or in the case of late-registered participants or sponsors, even after the virtual expo begins.

At block 720, the video conference provider generates a virtual expo floor based on the configuration information, such as based on the position of one or more virtual expo booths. As shown in FIG. 4, a virtual expo floor may be arranged to provide the appearance of a live exposition with virtual expo booths positioned on the virtual expo floor according to a predetermined arrangement or may be dynamically positioned by the video conference provider 310, such as after sponsor registration has closed.

In this example, the virtual expo floor provides a two-dimensional, top-down experience to the participants. However, other examples may employ a three-dimensional experience or a virtual or augmented reality experience.

At block 730, the video conference provider 310 establishes a virtual meeting within which to host the virtual expo. In this example, registered sponsors and participants received a link via which they can access the virtual meeting once the time for the virtual expo has arrived. A virtual meeting may be established generally as described above with respect to FIGS. 1-3. However, in this example, the virtual meeting may provide one or more audio or video feeds corresponding to the virtual expo floor or that provide a view of the virtual expo floor.

At block 740, the video conference provider 310 receives requests from one or more participants or one or more sponsors to join the virtual expo. For example, when a participant or sponsor registers for the virtual expo, they video conference provider 310 may generate an invitation that includes a link, such as a uniform resource locator ("URL") link, that the sponsor or participant may use to access the virtual expo, generally as discussed above with respect to FIGS. 1-2.

At block 750, the video conference provider 310 joins participants via their client devices to the virtual expo. As a part of joining a participant to the virtual expo, the video conference provider 310 authenticates the participant, such as by receiving access credentials (e.g., a username and password) for a user account with the video conference provider 310 or by communicating with a user identity provider 215. After authenticating the participant, the virtual conference provider 310 accesses registration information associated with the participant, such as their access level or sponsorship level. The virtual conference provider 310 may also obtain additional configuration information, such as whether the participant would like to engage in networking with other participants or whether the participant has particular stated interests or is associated with a sponsor of the virtual expo.

After determining various configuration parameters for the participant, the video conference provider 310 joins the participant to the virtual meeting that includes the virtual expo. This may involve publishing one or more multimedia streams for the participant's client device to access or selecting a location within the virtual expo floor to place the participant's avatar. Thus, the user joins the meeting and thereby joins the virtual expo.

At block 760, the video conference provider 310 provides information describing the virtual expo floor 401 to each participant that joins the virtual expo 400. For example, the video conference provider 310 may provide a layout of the virtual expo floor 401 to the participant's client device, which the client device may use to generate a graphical representation of the virtual expo floor. In some examples, the video conference provider 310 may generate a graphical representation of the virtual expo floor and provide it as a video stream to the participant. The information may include the locations and sponsors of various virtual expo booths. Thus, the participant may be able to view a graphical representation of the virtual expo floor 401, including one or more virtual expo booths available on it.

At block 770, the video conference provider 310 provides a location for the participant on the virtual expo floor 401. For example, the video conference provider 310 may provide coordinates for the participant's location, which the participant's client device may use to display an avatar on a graphical representation of the virtual expo floor. In another example, the video conference provider 310 may update a graphical representation of the virtual expo floor 401 to include the participant's avatar at a location on the virtual expo floor 401 and provide the updated graphical representation to the participant via their client device. Similarly, the video conference provider 310 may provide the locations of other participants on the virtual expo floor 401, such as by providing coordinates for those participants or by generating updated graphical representations of the virtual expo floor 401 to provide to the various participants in the virtual expo.

At block 780, the virtual conference provider 310 receives a selection of a virtual expo booth from a participant. For example, a user may touch a touchscreen on their client device at a location of a virtual expo booth to provide a selection of the virtual expo booth the video conference provider 310. In some examples the participant may navigate their avatar into proximity of a virtual expo booth to select it. Further, selection of the virtual expo booth may include a selection of the virtual expo booth as well as a further instruction regarding an action to take, such as to enter the virtual expo booth.

At block 790, the virtual conference provider 310 joins the participant to another meeting from the virtual expo. In this example, the new meeting corresponds to the virtual expo booth or to a booth space "within" the virtual expo booth. After joining this new meeting, the participant may interact with a presentation or conversation occurring within the virtual expo booth. Or the participant may select an option to interact with a resource table or to join a further booth space within the virtual expo booth. Joining such a further booth space involves joining a further meeting associated with the booth space. However, the video conference provider 310 may maintain a sequence of meetings joined by the participant to allow them to progressively exit and a meeting and return to the meeting they had most recently left, e.g., by leaving a booth space to rejoin virtual expo booth. Alternatively, the video conference provider 310 may allow a participant to exit a nested booth space and directly return to the virtual expo floor 401.

In the example above, the video conference provider 310 joined the participant to the virtual expo booth without first determining any access restrictions on the virtual expo booth. However, in some examples, a virtual expo booth may have associated access restrictions. For example, a virtual expo booth may be restricted to participants have a specific access level or one of several access levels. Some virtual expo booths may have time-specific access restrictions. For example, a virtual expo booth may host a sneak preview of a new product before its release. The sneak preview may be limited to participants having a VIP or Industry Press access level or be associated with sponsors at the Presenting or Platinum level or tier. However, once the sneak preview has ended, the access restrictions may be removed, and the virtual expo booth may be open to any participants.

It should be appreciated that when a client device joins a virtual expo booth or a booth space, the client device may not be disconnected from the virtual meeting corresponding to the virtual expo. Instead, the client device may remain connected to the virtual expo, which may allow the participant's location to be noted by others in the virtual expo, even if the participant has entered a virtual expo booth or booth space. Similarly, if a participant enters a booth space from a virtual expo booth, their client device may not disconnect from the meeting corresponding to the virtual expo booth. Thus, while navigating a virtual expo, the participant's client device may be connected to multiple meetings simultaneously. However, in some examples, the client device may disconnect from one meeting when entering another.

Example methods according to this disclosure, such as the example discussed above may enable expo hosts to easily create, configure, and host virtual expos via a video conference provider. By providing customizable virtual expo floors, virtual expo booths, sponsor levels, and participant access levels, the expo host may host a non-linear expo experience for its participants. Because participants may navigate the virtual expo at their own discretion, and may join and leave virtual expo booths at any time, a more freeform expo experience may be provided. While some expo booths may provide scheduled content, others may provide open discussion or interaction between participants and sponsors hosting the expo booths. By providing the frameworks to enable expo hosts to customize the virtual expo experience for their sponsors and participants, while providing different levels of access to each, expo hosts can provide full-featured and compelling virtual expo experiences.

Figure 8:
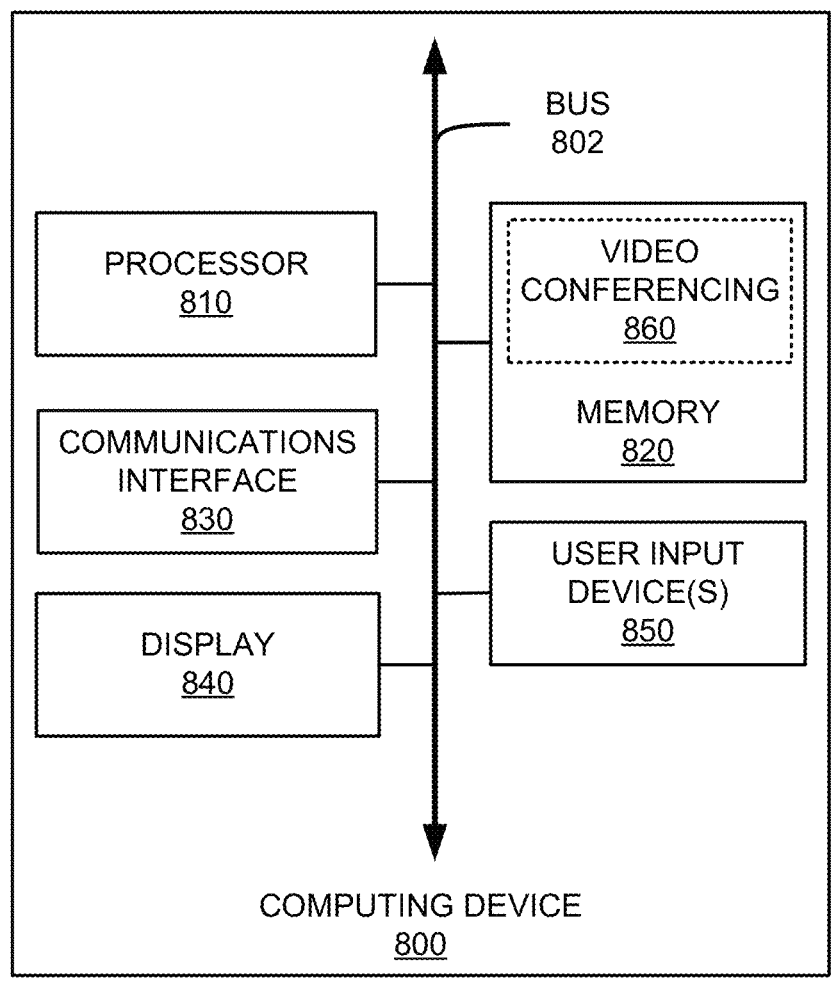
FIG. 8 shows an example computing device suitable for use with example systems and methods for systems for creating video conference expos.

Referring now to FIG. 8, FIG. 8 shows an example computing device 800 suitable for use in example systems or methods for creating video conference expos according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for creating video conference expos according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in a video conference, such as a conventional meeting or webinar, by receiving multimedia streams from a video conference provider, sending multimedia streams to the video conference provider, joining and leaving breakout rooms, creating video conference expos, etc., such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Multiple examples have been discussed; however, any number of examples may be employed according to this disclosure. For example, a first example includes a method that includes receiving configuration information for a video conference virtual exposition ("expo"), the configuration information comprising information associated with one or more virtual expo booths; generating a virtual expo floor based on the one or more virtual expo booths; establishing the virtual expo; receiving requests to join the virtual expo from a plurality of client devices, each client device associated with a respective participant; joining each client device of the plurality of client devices to the virtual expo; providing, to each joined client device, information describing the virtual expo floor and locations of each of the one or more virtual expo booths; providing, to each joined client device, a location of a respective participant avatar on the virtual expo floor; receiving, via a first client device, a selection of a first virtual expo booth from a first participant; and joining the first client device to a virtual meeting associated with the first expo booth.

A second example employs the method of the first example, further comprising receiving a request to join a first virtual expo booth, the request associated with a first participant; determining an access level for the first participant based on a first participant profile; and responsive to determining the access level is sufficient for access to the first virtual expo booth, joining the first participant to the first virtual expo booth.

A third example employs the method of the first or second example, further comprising obtaining a floor layout for the virtual expo floor; and positioning the one or more virtual expo booths according to the floor layout.

A fourth example employs the method of any of the first to third examples, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

A fifth example employs the method of any of the first to fourth examples, further comprising receiving expo booth configuration information for each virtual expo booth, wherein the expo booth configuration information includes access levels for content available within a respective virtual expo booth.

A sixth example employs the method of the fifth example, wherein the expo booth configuration information includes scheduled times during which a respective virtual expo booth is open to participants of the virtual expo or access levels to access a respective virtual expo booth or content available within the respective virtual expo booth.

A seventh example employs the method of any of the first to sixth examples, wherein the information describing the virtual expo floor and locations of each of the one or more virtual expo booths includes information to enable a three-dimensional view of the virtual expo floor and the one or more virtual expo booths.

An eighth example is a system that includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to receive configuration information for a video conference virtual exposition ("expo"), the configuration information comprising information associated with one or more virtual expo booths; generate a virtual expo floor based on the one or more virtual expo booths; establish the virtual expo; receive requests to join the virtual expo from a plurality of client devices, each client device associated with a respective participant; join each client device of the plurality of client devices to the virtual expo; provide, to each joined client device, information describing the virtual expo floor and locations of each of the one or more virtual expo booths; provide, to each joined client device, a location of a respective participant avatar on the virtual expo floor; receive, via a first client device, a selection of a first virtual expo booth from a first participant; and join the first client device to a virtual meeting associated with the first expo booth.

A ninth example employs the system of the eighth example, wherein the one or more processors are configured to execute further processor-executable instructions stored in the non-transitory computer-readable medium to receive a request to join a first virtual expo booth, the request associated with a first participant; determine an access level for the first participant based on a first participant profile; and responsive to a determination that the access level is sufficient for access to the first virtual expo booth, join the first participant to the first virtual expo booth.

A tenth example employs the system of the eighth or ninth examples, wherein the one or more processors are configured to execute further processor-executable instructions stored in the non-transitory computer-readable medium to obtain a floor layout for the virtual expo floor; and position the one or more virtual expo booths according to the floor layout.

An eleventh example employs the system of any of the eighth through tenth examples, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

A twelfth example employs the system of any of the eighth through eleventh examples, wherein the one or more processors are configured to execute further processor-executable instructions stored in the non-transitory computer-readable medium to receive expo booth configuration information for each virtual expo booth, wherein the expo booth configuration information includes access levels for content available within a respective virtual expo booth.

A thirteenth example employs the system of the twelfth example, wherein the expo booth configuration information includes scheduled times during which a respective virtual expo booth is open to participants of the virtual expo or access levels to access a respective virtual expo booth or content available within the respective virtual expo booth.

A fourteenth example employs the system of any of the eighth through thirteenth examples, wherein the information describing the virtual expo floor and locations of each of the one or more virtual expo booths includes information to enable a three-dimensional view of the virtual expo floor and the one or more virtual expo booths.

A fifteenth example is a non-transitory computer-readable medium that includes processor-executable instructions configured to cause one or more processors to receive configuration information for a video conference virtual exposition ("expo"), the configuration information comprising information associated with one or more virtual expo booths; generate a virtual expo floor based on the one or more virtual expo booths; establish the virtual expo; receive requests to join the virtual expo from a plurality of client devices, each client device associated with a respective participant; join each client device of the plurality of client devices to the virtual expo; provide, to each joined client device, information describing the virtual expo floor and locations of each of the one or more virtual expo booths; provide, to each joined client device, a location of a respective participant avatar on the virtual expo floor; receive, via a first client device, a selection of a first virtual expo booth from a first participant; and join the first client device to a virtual meeting associated with the first expo booth.

A sixteenth example employs the non-transitory computer-readable medium of the fifteenth example, further comprising processor-executable instructions configured to cause the one or more processors to receive a request to join a first virtual expo booth, the request associated with a first participant; determine an access level for the first participant based on a first participant profile; and responsive to a determination that the access level is sufficient for access to the first virtual expo booth, join the first participant to the first virtual expo booth.

A seventeenth example employs the non-transitory computer-readable medium of the fifteenth or sixteenth examples, further comprising processor-executable instructions configured to cause the one or more processors to obtain a floor layout for the virtual expo floor; and position the one or more virtual expo booths according to the floor layout.

An eighteenth example employs the non-transitory computer-readable medium of any of the fifteenth through seventeenth examples, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

A nineteenth example employs the non-transitory computer-readable medium of any of the fifteenth through eighteenth examples, further comprising processor-executable instructions configured to cause the one or more processors to receive expo booth configuration information for each virtual expo booth, wherein the expo booth configuration information includes access levels for content available within a respective virtual expo booth.

A twentieth example employs the non-transitory computer-readable medium of the nineteenth example, wherein the expo booth configuration information includes scheduled times during which a respective virtual expo booth is open to participants of the virtual expo or access levels to access a respective virtual expo booth or content available within the respective virtual expo booth.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving configuration information for a virtual expo, the configuration information comprising information associated with one or more virtual expo booths;
generating a virtual expo floor based on the one or more virtual expo booths;
establishing the virtual expo, the virtual expo comprising one or more virtual expo booths;
establishing a virtual meeting associated with a first virtual expo booth;
receiving requests to join the virtual expo from a plurality of client devices, each client device associated with a respective participant;
joining each client device of the plurality of client devices to the virtual expo;
providing, to each joined client device, information describing the virtual expo floor and locations of each of the one or more virtual expo booths;
providing, to each joined client device, a location of a respective participant avatar on the virtual expo floor;
receiving, via a first client device, a selection of the first virtual expo booth from a first participant; and
joining the first client device to the virtual meeting associated with the first virtual expo booth.

2. The method of claim 1, further comprising:
receiving a request to join the first virtual expo booth, the request associated with a first participant;
determining an access level for the first participant based on a first participant profile; and
responsive to determining the access level is sufficient for access to the first virtual expo booth, joining the first participant to the first virtual expo booth.

3. The method of claim 1, further comprising:
obtaining a floor layout for the virtual expo floor; and
positioning the one or more virtual expo booths according to the floor layout.

4. The method of claim 1, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

5. The method of claim 1, further comprising:
receiving expo booth configuration information for each virtual expo booth, wherein the expo booth configuration information includes access levels for content available within a respective virtual expo booth.

6. The method of claim 5, wherein the expo booth configuration information includes scheduled times during which a respective virtual expo booth is open to participants of the virtual expo or access levels to access a respective virtual expo booth or content available within the respective virtual expo booth.

7. The method of claim 1, wherein the information describing the virtual expo floor and locations of each of the one or more virtual expo booths includes information to enable a three-dimensional view of the virtual expo floor and the one or more virtual expo booths.

8. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive configuration information for a virtual expo, the configuration information comprising information associated with one or more virtual expo booths;
generate a virtual expo floor based on the one or more virtual expo booths;

establish the virtual expo, the virtual expo comprising one or more virtual expo booths;

establish a virtual meeting associated with a first virtual expo booth;

receive requests to join the virtual expo from a plurality of client devices, each client device associated with a respective participant;

join each client device of the plurality of client devices to the virtual expo;

provide, to each joined client device, information describing the virtual expo floor and locations of each of the one or more virtual expo booths;

provide, to each joined client device, a location of a respective participant avatar on the virtual expo floor;

receive, via a first client device, a selection of the first virtual expo booth from a first participant; and join the first client device to the virtual meeting associated with the first virtual expo booth.

9. The system of claim 8, wherein the one or more processors are configured to execute further processor-executable instructions stored in the non-transitory computer-readable medium to:

receive a request to join the first virtual expo booth, the request associated with a first participant;

determine an access level for the first participant based on a first participant profile; and responsive to a determination that the access level is sufficient for access to the first virtual expo booth, join the first participant to the first virtual expo booth.

10. The system of claim 8, wherein the one or more processors are configured to execute further processor-executable instructions stored in the non-transitory computer-readable medium to:

obtain a floor layout for the virtual expo floor; and position the one or more virtual expo booths according to the floor layout.

11. The system of claim 8, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

12. The system of claim 8, wherein the one or more processors are configured to execute further processor-executable instructions stored in the non-transitory computer-readable medium to:

receive expo booth configuration information for each virtual expo booth, wherein the expo booth configuration information includes access levels for content available within a respective virtual expo booth.

13. The system of claim 12, wherein the expo booth configuration information includes scheduled times during which a respective virtual expo booth is open to participants of the virtual expo or access levels to access a respective virtual expo booth or content available within the respective virtual expo booth.

14. The system of claim 8, wherein the information describing the virtual expo floor and locations of each of the one or more virtual expo booths includes information to enable a three-dimensional view of the virtual expo floor and the one or more virtual expo booths.

15. A non-transitory computer-readable medium comprising processor-executable instructions configured to cause one or more processors to:

receive configuration information for a virtual expo, the configuration information comprising information associated with one or more virtual expo booths;

generate a virtual expo floor based on the one or more virtual expo booths;

establish the virtual expo, the virtual expo comprising one or more virtual expo booths;

establish a virtual meeting associated with a first virtual expo booth;

receive requests to join the virtual expo from a plurality of client devices, each client device associated with a respective participant;

join each client device of the plurality of client devices to the virtual expo;

provide, to each joined client device, information describing the virtual expo floor and locations of each of the one or more virtual expo booths;

provide, to each joined client device, a location of a respective participant avatar on the virtual expo floor;

receive, via a first client device, a selection of the first virtual expo booth from a first participant; and join the first client device to the virtual meeting associated with the first virtual expo booth.

16. The non-transitory computer-readable medium of claim 15, further comprising processor-executable instructions configured to cause the one or more processors to:

receive a request to join the first virtual expo booth, the request associated with a first participant;

determine an access level for the first participant based on a first participant profile; and responsive to a determination that the access level is sufficient for access to the first virtual expo booth, join the first participant to the first virtual expo booth.

17. The non-transitory computer-readable medium of claim 15, further comprising processor-executable instructions configured to cause the one or more processors to:

obtain a floor layout for the virtual expo floor; and position the one or more virtual expo booths according to the floor layout.

18. The non-transitory computer-readable medium of claim 15, wherein the configuration information comprises one or more of a virtual expo sponsor, a number of virtual expo booths, sponsor information for each virtual expo booth, sponsorship level for one or more sponsors of respective virtual expo booths, or available access levels for the virtual expo.

19. The non-transitory computer-readable medium of claim 15, further comprising processor-executable instructions configured to cause the one or more processors to:

receive expo booth configuration information for each virtual expo booth, wherein the expo booth configuration information includes access levels for content available within a respective virtual expo booth.

20. The non-transitory computer-readable medium of claim 19, wherein the expo booth configuration information includes scheduled times during which a respective virtual expo booth is open to participants of the virtual expo or access levels to access a respective virtual expo booth or content available within the respective virtual expo booth.

* * * * *